(12) United States Patent
Thaliath et al.

(10) Patent No.: US 12,486,958 B2
(45) Date of Patent: Dec. 2, 2025

(54) VEHICLE LIGHT APPARATUS

(71) Applicant: Rivian IP Holdings, LLC, Plymouth, MI (US)

(72) Inventors: Vinu Thaliath, Bristol (GB); Minesh Madhusudan Chaudhari, Indianapolis, IN (US); Simon Baker, Basingstoke (GB); Shammika Ashan Wickramasinghe, Banbury (GB)

(73) Assignee: Rivian IP Holdings, LLC, Irvine, CA (US)

( * ) Notice: Subject to any disclaimer, the term of this patent is extended or adjusted under 35 U.S.C. 154(b) by 334 days.

(21) Appl. No.: 18/057,356

(22) Filed: Nov. 21, 2022

(65) Prior Publication Data

US 2024/0167655 A1    May 23, 2024

(51) Int. Cl.
*F21S 41/25*    (2018.01)
*B60Q 1/00*    (2006.01)
*F21S 41/143*    (2018.01)

(52) U.S. Cl.
CPC ............ *F21S 41/25* (2018.01); *B60Q 1/0011* (2013.01); *F21S 41/143* (2018.01)

(58) Field of Classification Search
CPC ..................................................... B60Q 1/0011
USPC ........................................................ 362/520
See application file for complete search history.

(56) References Cited

U.S. PATENT DOCUMENTS

| | | | |
|---|---|---|---|
| 8,322,902 B2 | 12/2012 | Martin et al. | |
| 8,789,991 B2 | 7/2014 | Martin et al. | |
| 9,121,566 B2 | 9/2015 | De Lamberterie | |
| 11,427,137 B2* | 8/2022 | Studeny | B60R 13/005 |
| 2015/0138809 A1* | 5/2015 | Salter | B60R 13/005 362/510 |
| 2017/0240100 A1* | 8/2017 | Salter | B60R 13/005 |

FOREIGN PATENT DOCUMENTS

| | | |
|---|---|---|
| EP | 2 161 494 B1 | 11/2011 |
| EP | 2 792 940 B1 | 9/2016 |
| EP | 2 098 774 B1 | 7/2020 |

* cited by examiner

*Primary Examiner* — Christopher M Raabe
(74) *Attorney, Agent, or Firm* — Foley & Lardner LLP

(57) ABSTRACT

The apparatus having a light fixture is provided. The apparatus can include a collimator. The collimator can be coupled with the light fixture. The collimator can adjust light produced by a light source from a first path to a second path. The apparatus can include a film. The film can conceal at least a portion of the light source.

17 Claims, 13 Drawing Sheets

VEHICLE LIGHT APPARATUS

INTRODUCTION

Vehicles can have batteries and the batteries can provide power to components of the vehicle.

SUMMARY

This disclosure is generally directed to an apparatus. The apparatus can be included in at least one of a vehicle, a stationary battery unit, an office building, an apartment building or a house. The apparatus can include a light fixture. The light fixture can be at least one of a head light, a tail light, a crossbar light, a light bar, a charge indicator light, a turn signal light, a directional light, a reverse light, a flood light, a stop light, a fog light, an interior light, a display light or a dome light. The apparatus can match at least one of the shape, color, appearance or design of the object that the apparatus is included in. For example, the apparatus can match at least one of the vehicle body shape, the vehicle color or the vehicle design. The apparatus can have a seamless color, appearance or shape that blends in with the vehicle or a component thereof. The apparatus blending in with the vehicle enables the apparatus or a component thereof to remain hidden, unseen, camouflaged, concealed or otherwise discrete prior to the apparatus producing light. The apparatus may be partially or fully undetectable and/or invisible to the naked eye unless the apparatus produces light.

At least one aspect is directed to an apparatus. The apparatus can include a light fixture. The apparatus can include a collimator. The collimator can be coupled with the light fixture. The collimator can adjust light produced by a light source from a first path to a second path. The apparatus can include a film. The film can conceal at least a portion of the light source.

At least one aspect is directed to a method of manufacturing an apparatus. The method can include coupling a collimator with a light fixture. The collimator can adjust light produced by a light source from a first path to a second path. The method can also include disposing a film on the collimator. The film can conceal at least a portion of the light source.

At least one aspect is directed to an electric vehicle. The electric vehicle can include an apparatus. The apparatus can include a light fixture. The apparatus can include a collimator. The collimator can be coupled with the light fixture. The collimator can adjust light produced by a light source from a first path to a second path. The apparatus can include a film. The film can conceal at least a portion of the light source.

At least one aspect is directed to a method. The method can include providing an apparatus. The apparatus can include a light fixture. The apparatus can include a collimator. The collimator can be coupled with the light fixture. The collimator can adjust light produced by a light source from a first path to a second path. The apparatus can include a film. The film can conceal at least a portion of the light source.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of providing an apparatus. The various concepts introduced above and discussed in greater detail below may be implemented in any of numerous ways.

The present disclosure is directed to systems and methods of providing an apparatus. This technical solution can enable a light fixture to meet all regulatory requirements while also being able to produce a light fixture that can be comprised of similar material to that of the vehicle which decreases the amount of materials required to build a vehicle or components of the vehicle. Additionally, the light fixture is made with material that has improved protection against damage.

Figure 1:
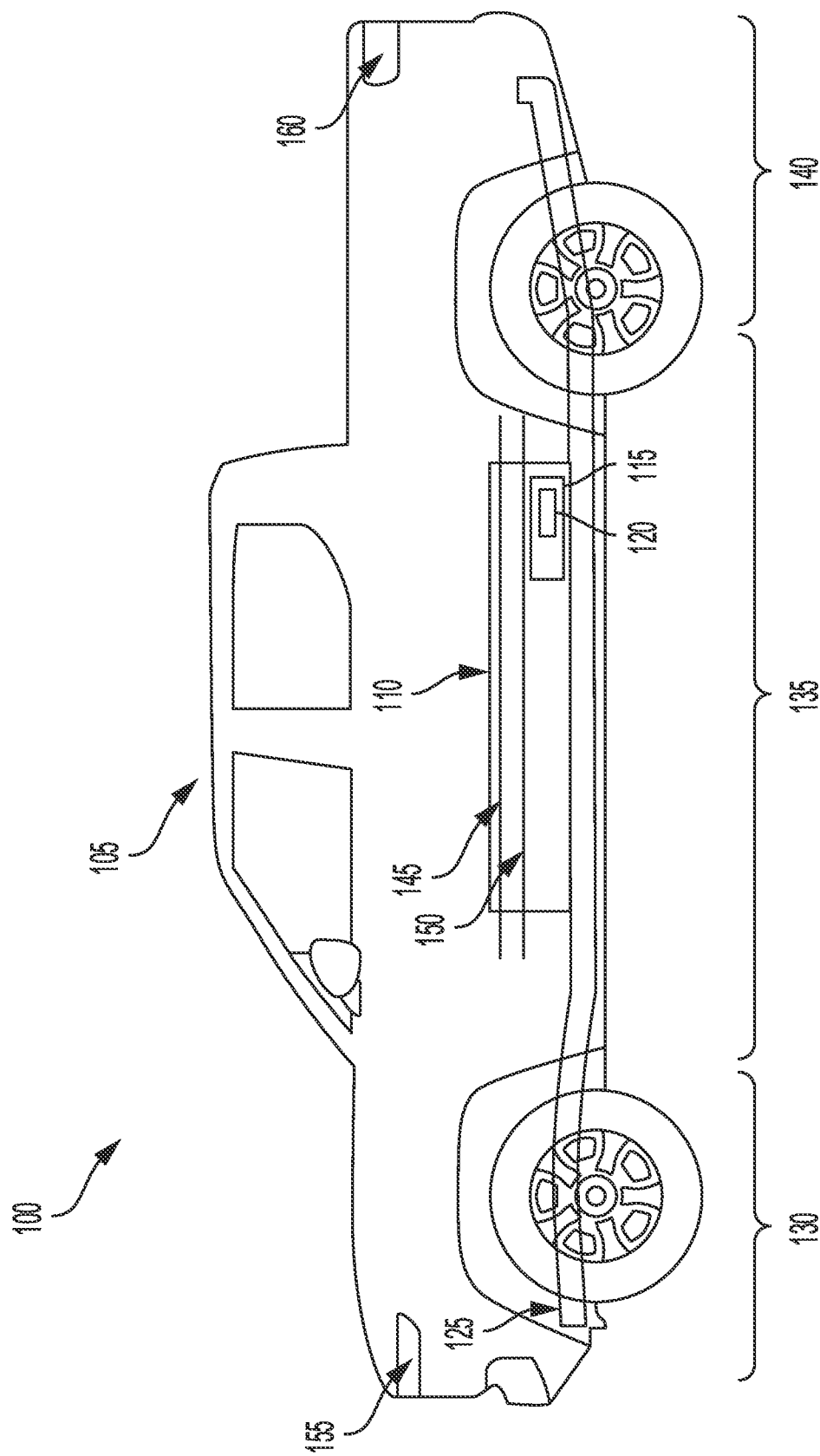
FIG. 1 depicts an electric vehicle, in accordance with an implementation.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105. The vehicle 105 can include at least one head light 155 and at least one tail light 160.

Figure 2:
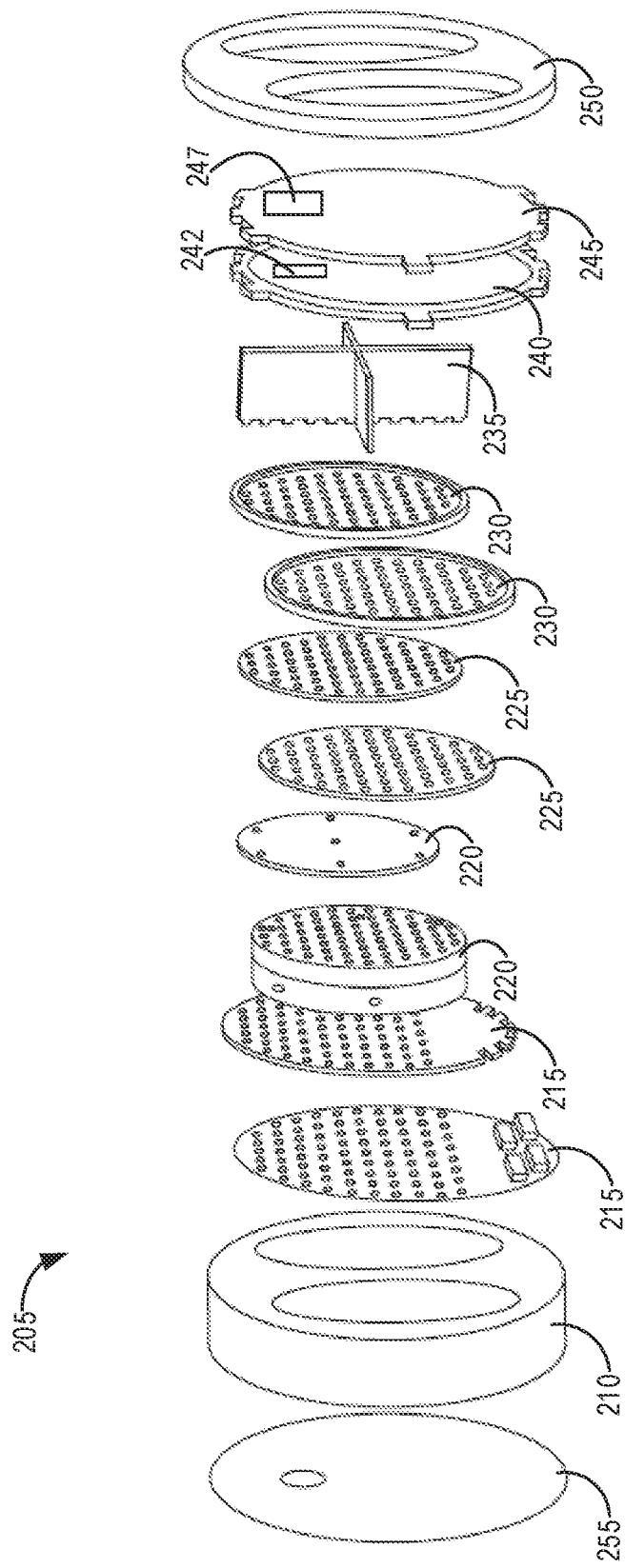
FIG. 2 depicts an example apparatus, in accordance with an implementation.

FIG. 2 depicts an apparatus 205. The apparatus 205 can be mounted, attached, placed, secured or coupled with a vehicle. For example, the apparatus 205 can be coupled with the vehicle 105. The apparatus 205 can include at least one light fixture 210. The light fixture 210 can be at least one of a head light, a tail light, a crossbar light, a light bar, a charge indicator light, a turn signal light, a directional light, a reverse light, a flood light, a stop light, a fog light, an interior light, a display light or a dome light. For example, the light fixture 210 can be or include at least one of the head light 155 or the tail light 160. The light fixture 210 can also be located, placed, positioned or otherwise disposed on or within the head light 155 or the tail light 160. For example, the light fixture 210 can be a charge indicator light and the charge indicator light can be included in the head light 155 or a component thereof. The light fixture 210 can remain hidden within the headlight 155 while the light source 215 is off (e.g., the light source 215 is not producing light) and the light fixture 210 can be noticed responsive to the light source 215 turning on (e.g., the light source 215 produces light).

The light fixture 210 can be electrically coupled with a power source. The light fixture 210 can receive power from the power source. For example, the power source can be the battery pack 110 and the light fixture 210 can receive power from the battery pack 110. The light fixture 210 can include at least one light source 215. The light source 215 can produce light. For example, the light source 215 can produce light by emitting at least one photon. The light source 215 can be or include at least one of at least one light emitting diode (LED), at least one incandescent bulb, at least one fluorescent lamp or at least one halogen lamp. The light fixture 210 can include at least one first cover 220. The cover 220 can be mounted, attached, placed, secured or coupled with the light source 215. The cover 220 can cover a side of the light source 215. For example, the cover 220 can cover a first side of the light source 215.

The apparatus 205 can include at least one first collimator 225. The collimator 225 can be mounted, attached, placed, secured or coupled with the cover 220. The collimator 225 can modify, direct, change, alter or otherwise adjust the light produced by the light source 215. For example, the light source 215 can produce light and the light can have a first path (e.g., the path of the light leaving, exiting or otherwise moving away from the light source 215). The collimator 225 can gather, collect, or otherwise receive the light produced by the light source 215. For example, the collimator 225 can include at least one opening and the opening can be positioned in a predetermined position in order to receive the light produced by the light source. The collimator 225 can adjust the light produced by the light source 215 from the first path to a second path (e.g., a path that is a result of the collimator 225 adjusting the light produced by the light source 215). The collimator 225 can be shaped, designed or otherwise configured to adjust the light produced by the light source 215 from the first path to the second path. The collimator 225 can be or include at least one of a tube, a lens, a telescope or any other possible component that can adjust the light produced by the light source 215. The collimator 225 can include or be made of at least one of glass, metal or a crystalline material.

The apparatus 205 can include at least one second collimator 230. The collimator 230 can be mounted, attached, placed, secured or coupled with the collimator 225. The collimator 230 can be or include at least one of a tube, a lens, a telescope or any other possible component that can adjust the light produced by the light source 215. The collimator 230 can include or be made of at least one of glass, metal or a crystalline material. The collimator 230 can be similar to the collimator 225. For example, the collimator 230 can adjust the light produced by the light source 215. The collimator 230 can gather, collect, or otherwise receive the light adjusted by the collimator 225 (e.g., the second path). The collimator 230 can adjust the light produced by the light source 215 from the second path to a third path.

The apparatus 205 can include at least one partition 235. The partition 235 can be mounted, attached, placed, secured or coupled with at least one of the collimator 230 or the collimator 225. The partition 235 can gather, collect, or otherwise receive the light adjusted by the collimator 230. The partition 235 can separate, split, divide, part, reflect or otherwise direct the light produced by the light source 215. For example, the partition 235 can receive the light adjusted by the collimator 230 (e.g., the third path) and the partition 235 can direct the light to a plate.

The apparatus 205 can include at least one plate 240. The plate 240 can provide, transfer or redirect the light produced by the light source 215. The plate 240 can have at least one opening 242 that can transfer the light produced by the light source 215 by allowing the light to exit, leave or otherwise escape the apparatus 205. For example, the plate 240 can have at least one first opening 242 and at least one second opening 242. The first opening 242 can have a first size and the second opening 242 can have a second size. The first size and the second size can be different. For example, the first size can be larger or smaller than the second size. The size of the first opening 242 can determine the amount of light that is transferred by the first opening. The size of the second opening can determine the amount of light that is transferred by the second opening. The larger the size of the openings 242 allows for a greater amount of the light produced by the light source 215 to be transferred by the openings 242. The plate 240 can be mounted, attached, placed, secured or coupled with at least one of the partition 235, the collimator 230 or the collimator 225.

The apparatus 205 can include at least one film 245. The film 245 can be mounted, attached, placed, secured, coupled, or disposed on at least one of the plate 240, the collimator 230 or the collimator 225. The film 245 can prevent the light produced by the light source 215 from exiting the apparatus 205. For example, the film 245 can block, stop, halt or otherwise absorb the light produced by the light source 215. The film 245 can conceal at least one of the light fixture 210, the light source 215, the cover 220, the collimator 225, the collimator 230, the partition 235 or the plate 240. For example, the film 245 can conceal the light source 215 by blocking, preventing, obstructing or otherwise covering the light source 215 in a way that the light source 215 is indiscernible, indistinguishable or otherwise unnoticeable in relation to the vehicle 105. The film 245 can include at least one pattern 247. The pattern 247 can be at least one of a honeycomb pattern, a symmetrical pattern, an asymmetrical pattern, a circular pattern, a stadium pattern, a pill pattern or a karabiner pattern.

The pattern 247 can be designed, shaped, placed, located or otherwise configured to prevent the light produced by the light source 215 from exiting, from a first location, the apparatus 205. The location, orientation, positioning, configuration, design or placement of the pattern 247 can establish or define the opening 242. For example, the pattern 247 can occupy, cover, overly or otherwise take up an area on the plate 240. The placement of the film 245 or the pattern 247 on the plate 240 can define the opening 242. For example, an area occupied by the pattern 247 or the film 245 can prevent the light produced by the light source 215 from exiting the apparatus 205 or plate 240. Similarly, an area not occupied (e.g., the opening 242) by the pattern 247 or the film 245 can allow for the plate 240 to redirect the light produced by the light source 215. Similarly, the opening 242 can transfer the light produced by the light source 215 responsive to the placement of the pattern 247 defining the opening 242. The pattern 247 can also be designed, shaped, placed, located or otherwise configured to allow the light produced by the light source 215 to exit, from a second location (e.g., a second opening 242), the apparatus 205. For example, the pattern 247 can have at least one transparency level. The transparency level can indicate how much light can exit the pattern 247. For example, the pattern 247 can have a first transparency level and a second transparency level. The first transparency level can occupy, consume or otherwise take up the first location of the pattern 247. The second transparency level can occupy, consume or otherwise take up the second location of the pattern 247. The first transparency level can be at least one of larger, equal or smaller than the second transparency level. The first transparency level being smaller than the second transparency level can indicate that the first transparency level will prevent a larger amount of light, produced by the light source 215, from exiting the apparatus 205. The second transparency level being larger than the first transparency level can indicate that the second transparency level will allow a larger amount of light, produced by the light source 215, to exit the apparatus 205. The transparency level can indicate, establish or define at least one of the number of, the size of, the area of or the dimensions of the openings 242.

The apparatus 205 can include at least one second cover 250. The cover 250 can be mounted, attached, placed, secured or coupled with at least one of the plate 240 or the film 245. The cover 250 can resemble, blend in with or otherwise match at least one of a color associated with a vehicle (e.g., a color of the vehicle 105), an appearance associated with the vehicle 105 or a shape associated with the vehicle 105. For example, the vehicle 105 can have a curve (e.g., a shape) and the cover 250 can match the shape of the vehicle 105. The cover 250 matching the shape of the vehicle 105 results in the apparatus 205 remaining hidden until the light source 215 produces light (e.g., the light fixture turns on). The apparatus 205 can include at least one third cover 255. The cover 255 can be mounted, attached, placed, secured or coupled with the light fixture 210. The cover 255 can cover a side of at least one of the light fixture 210 or the light source 215. For example, the cover 255 can cover a first side of the light fixture 210.

At least one of the apparatus 205, the light fixture 210, the light source 215, the cover 220, the collimator 225, the collimator 230, the partition 235, the plate 240, the film 245, the cover 250 or the cover 255 can have one or more shapes, one or more configurations, one or more orientations, one or more designs, or one or more layouts. For example, the cover 250 can have at least one of a rectangular shape, a circular shape, a square shape, a cylindrical shape, an oval shape, a cone shape, a sphere shape, a triangle shape, a linear shape or any other possible shape. FIG. 2 depicts an example of the apparatus 205, the light fixture 210, the light source 215, the cover 220, the collimator 225, the collimator 230, the plate 240, the film 245, the cover 250 and the cover 255 having a circular shape and an example of the partition 235 having a linear shape.

Figure 3A:
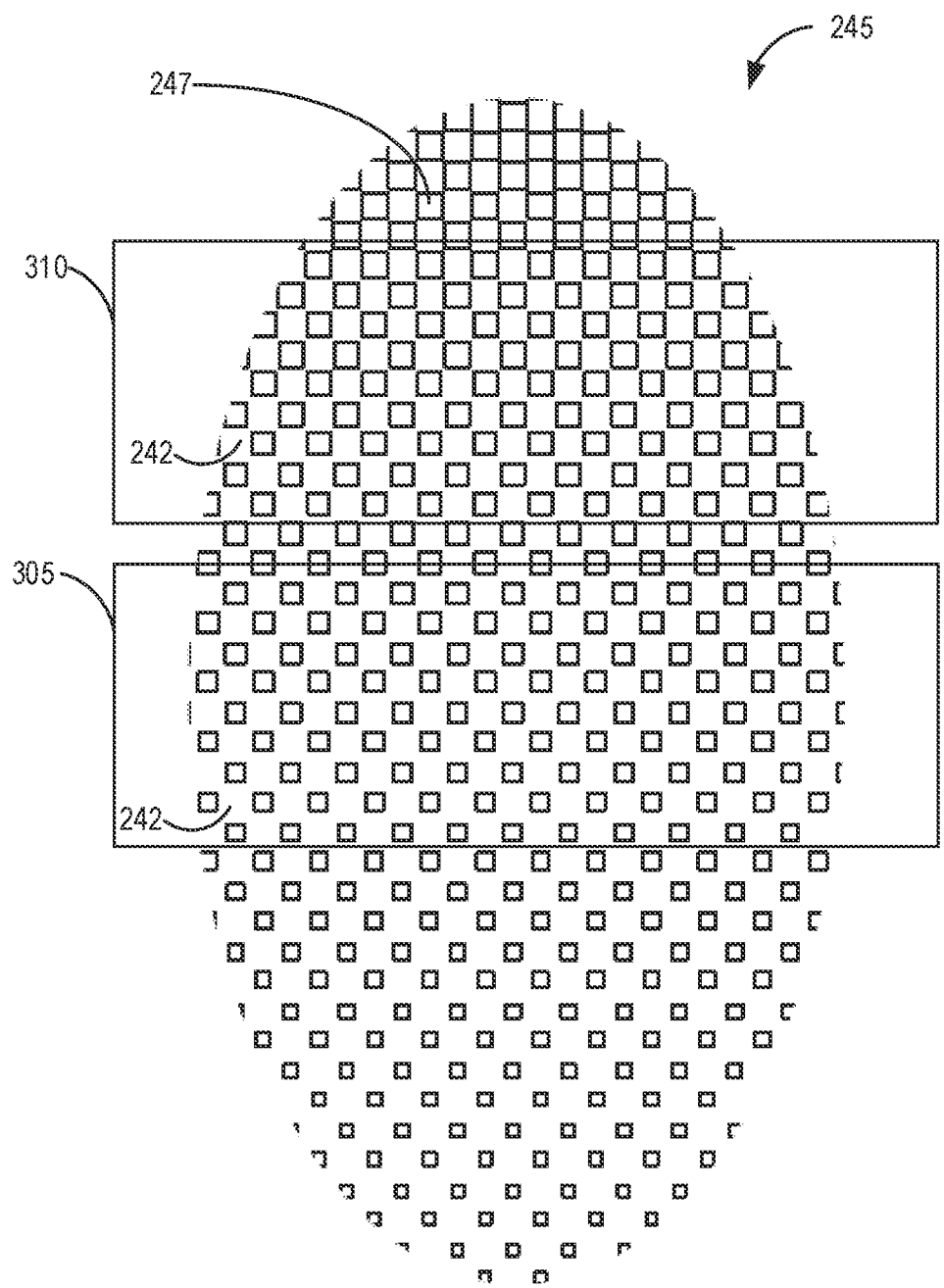
FIG. 3A depicts an example view of a film, in accordance with an implementation.

FIG. 3A depicts an example view of the film 245. The film 245 can include the pattern 247. The pattern 247 can include at least one transparency level 305 and at least one transparency level 310. FIG. 3A depicts an example of the pattern 247 as a symmetrical pattern and an example of the transparency level 305 being larger than the transparency level 310. As described herein the transparency level 305 being larger than the transparency level 310 indicates that a larger amount of light will exit the area of the pattern 247 that is occupied by the transparency level 305 in comparison to the amount of light that will exit the area of the pattern 247 that is occupied by the transparency level 310. For example, the first opening 242 located within the transparency level 305 has a larger size in comparison to the second opening 242 located with the transparency level 310.

Figure 3B:
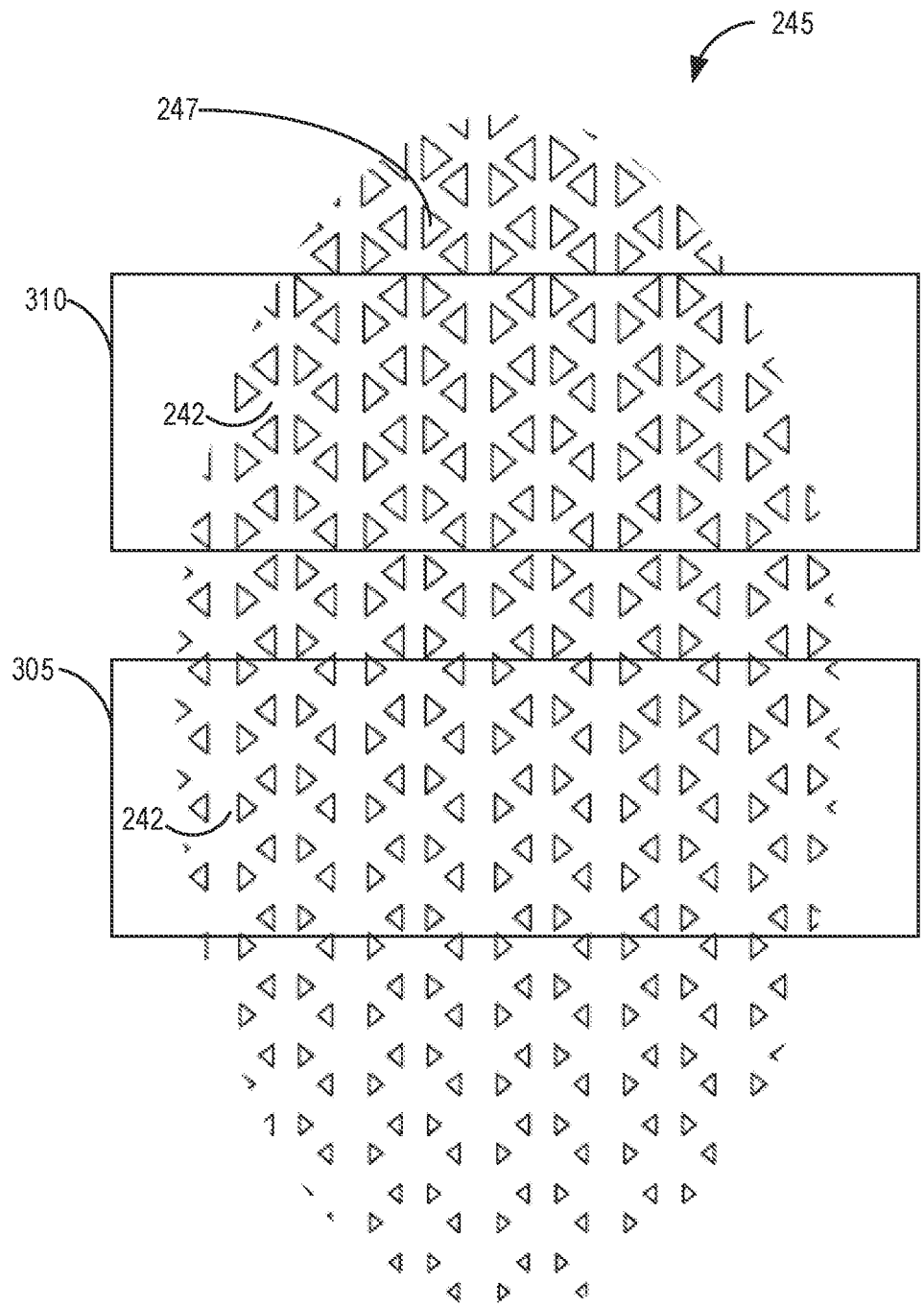
FIG. 3B depicts an example view of a film, in accordance with an implementation.

FIG. 3B depicts an example view of the film 245. FIG. 3B depicts an example of the pattern 247 as an asymmetrical pattern and an example of the transparency level 310 being smaller than the transparency level 305. As described herein the transparency level 310 being smaller than the transparency level 305 indicates that a smaller amount of light will exit the area of the pattern 247 that is occupied by the transparency level 310 in comparison to the amount of light that will exit the area of the pattern 247 that is occupied by the transparency level 305. For example, the second opening 242 located within the transparency level 310 has a smaller size in comparison to the first opening 242 located within the transparency level 305.

Figure 3C:
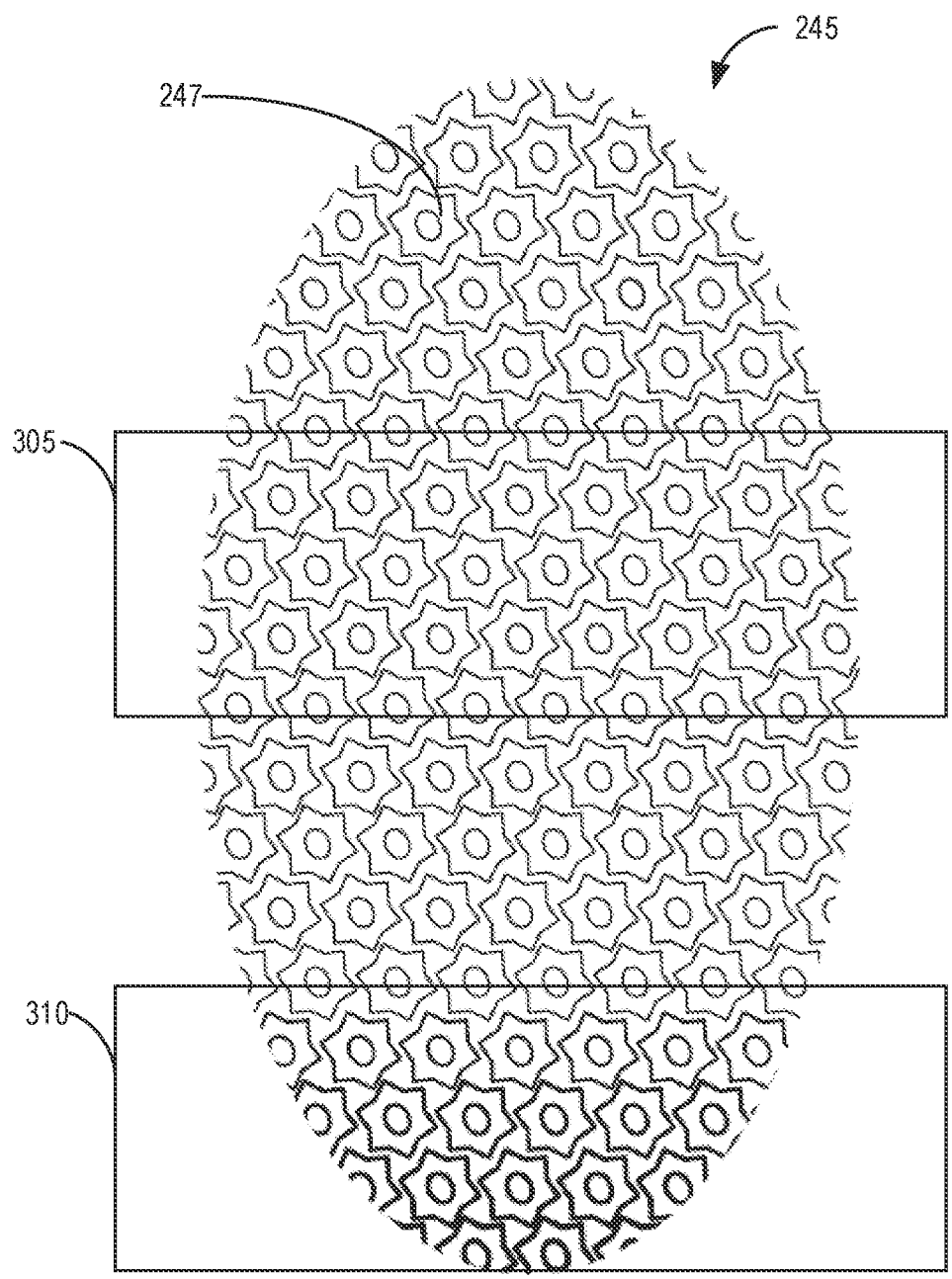
FIG. 3C depicts an example view of a film, in accordance with an implementation.

FIG. 3C depicts an example view of the film 245. FIG. 3C depicts an example of the pattern 247 as pill pattern and an example of the transparency level 305 being larger than the transparency level 310.

Figure 3D:
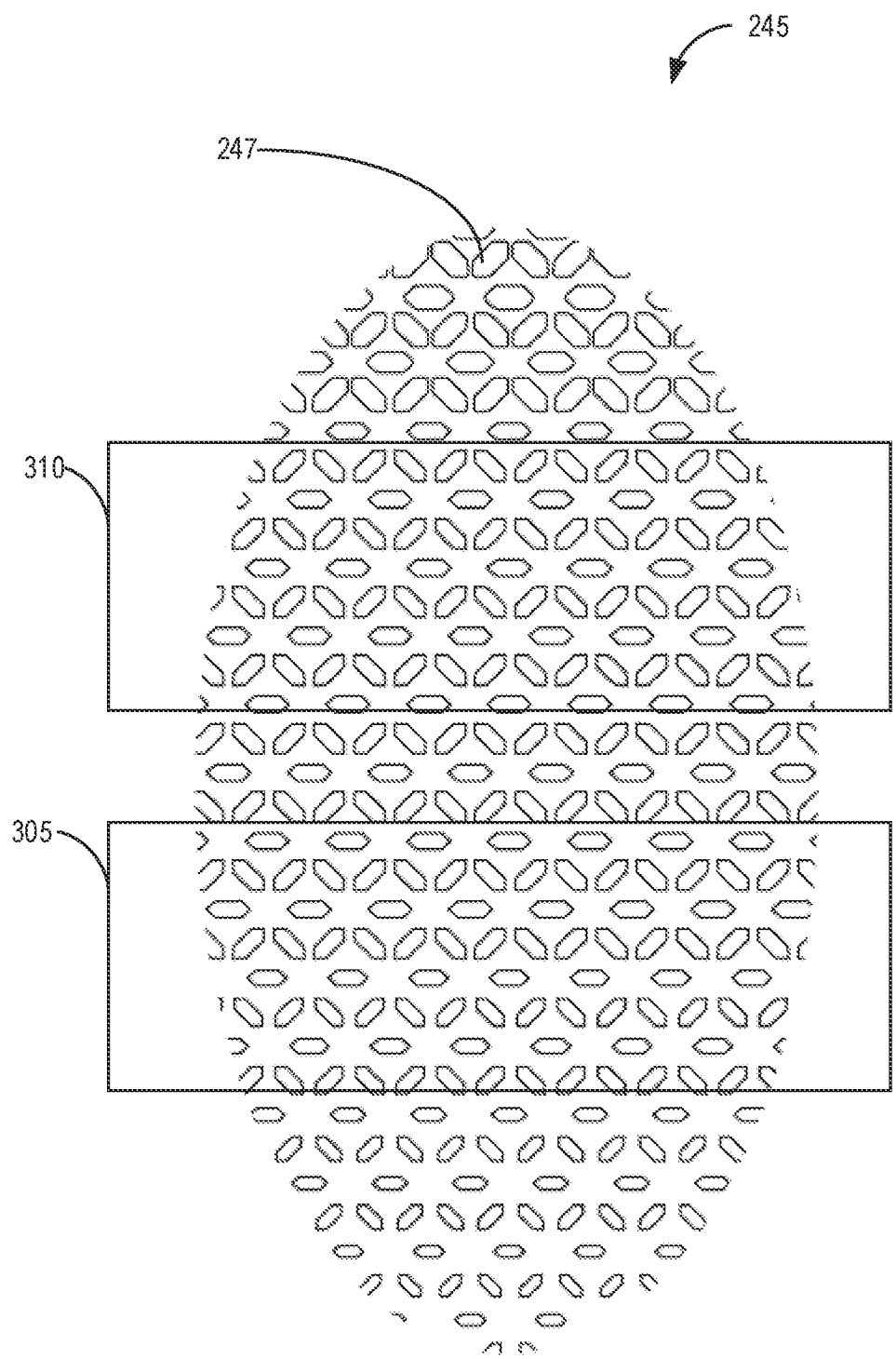
FIG. 3D depicts an example view of a film, in accordance with an implementation.

FIG. 3D depicts an example view of the film 245. FIG. 3D depicts an example of the pattern 247 as a honeycomb pattern and an example of the transparency level 305 being equal to the transparency level 310. As described herein the transparency level 305 being equal to the transparency level 310 indicates that a similar amount of light will exit the area of the pattern 247 occupied by the transparency level 305 in comparison to the amount of light that will exit the area of the pattern 247 that is occupied by the transparency level 310.

Figure 4:
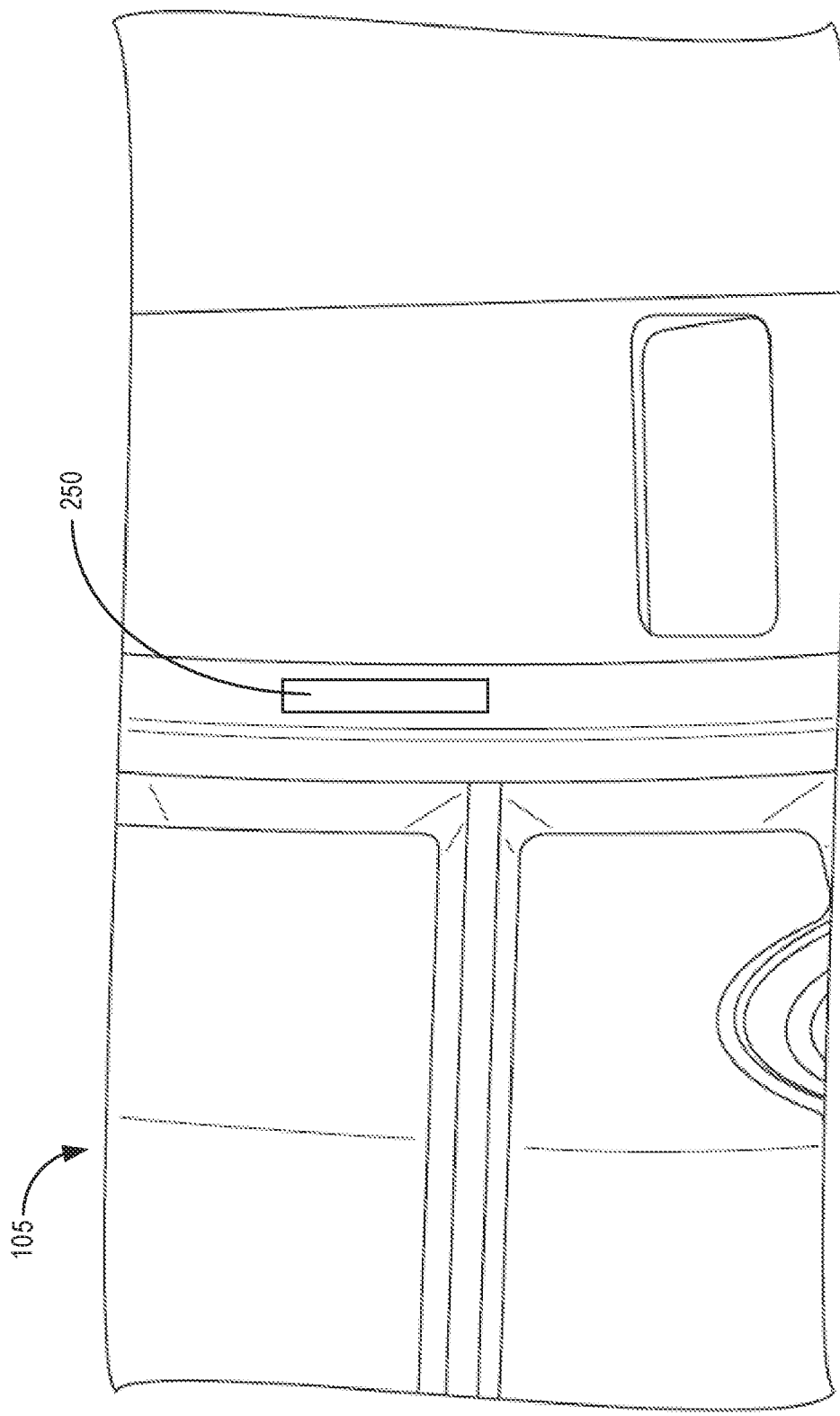
FIG. 4 depicts an example view of a vehicle, in accordance with an implementation.

FIG. 4 depicts an example view of the vehicle 105. The vehicle 105 can include the cover 250. FIG. 4 depicts an example of the cover 250 matching at least one of a color of the vehicle 105 or a shape of the vehicle 105.

Figure 5:
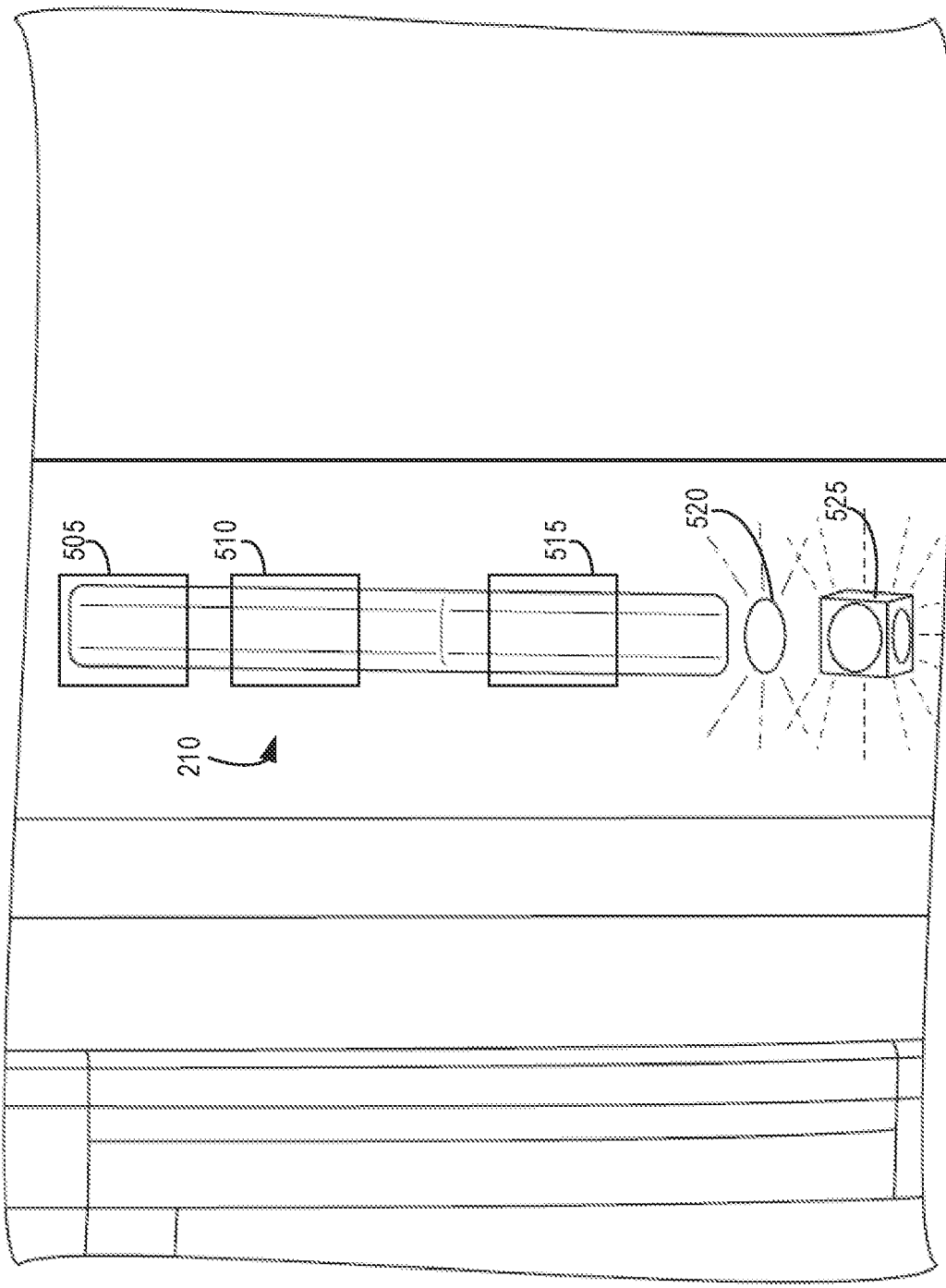
FIG. 5 depicts an example view of a vehicle, in accordance with an implementation.

FIG. 5 depicts an example view of the vehicle 105. The vehicle 105 can include the light fixture 210. FIG. 5 depicts an example of the light fixture 210 including a stop light 505, a tail light 510, a directional light 515, a reverse light 520 and a fog light 525.

Figure 6:
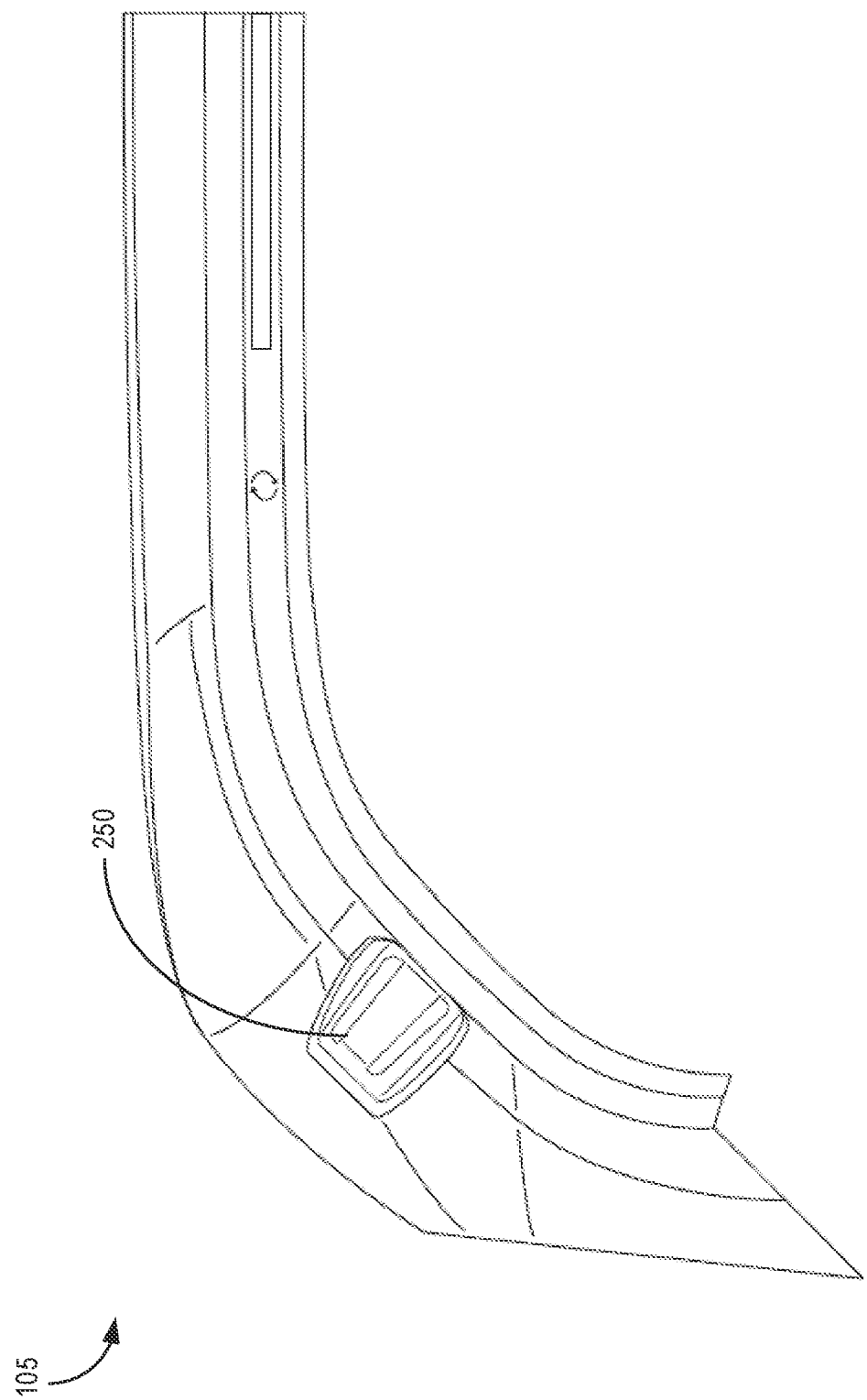
FIG. 6 depicts an example view of a vehicle, in accordance with an implementation.

FIG. 6 depicts an example view of the vehicle 105. FIG. 6 depicts an example of the cover 250 matching a color of the vehicle 105.

Figure 7:
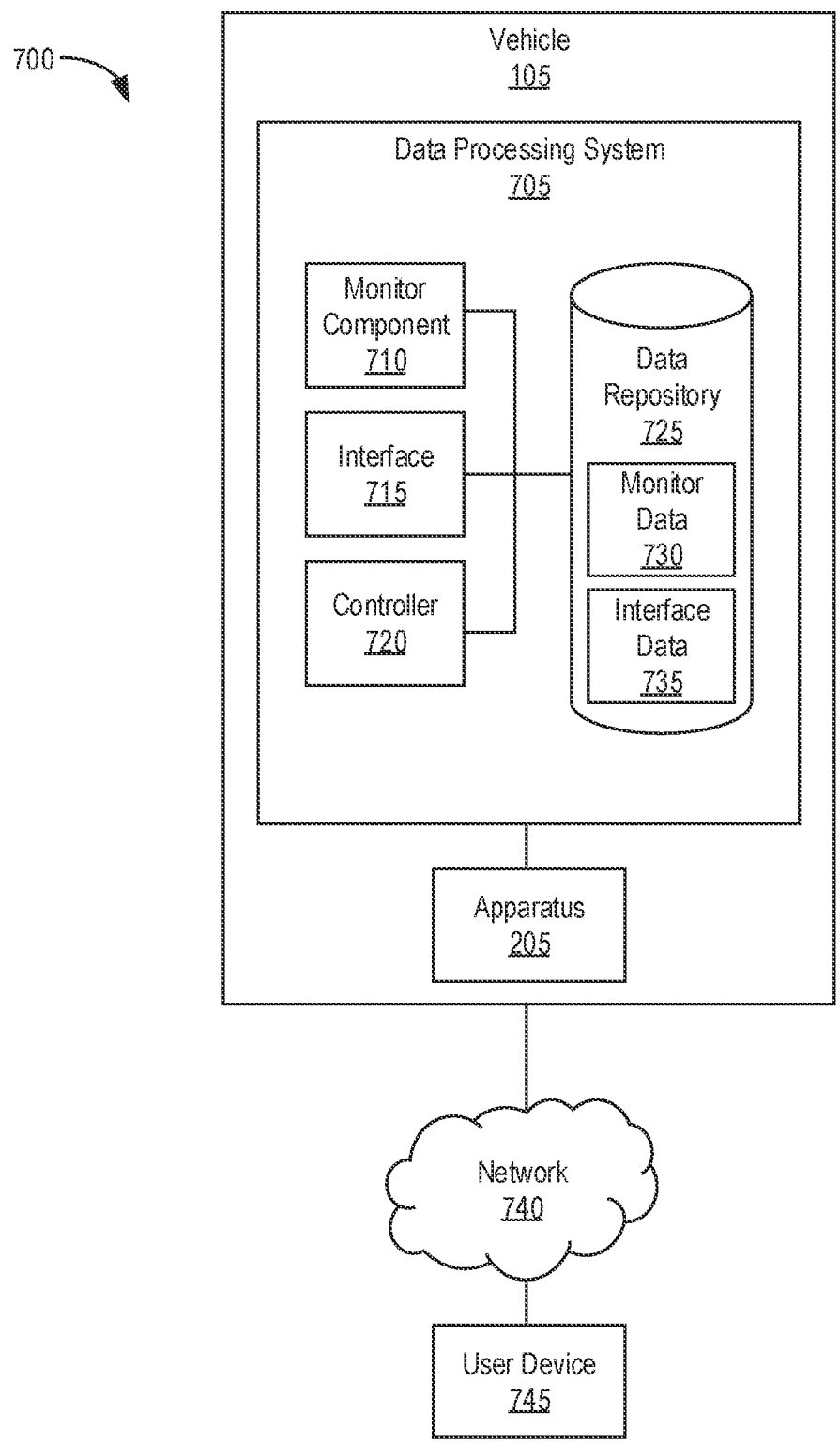
FIG. 7 depicts an example system to control an apparatus, in accordance with an implementation.

FIG. 7 depicts an example system 700 to control an apparatus, in accordance with an implementation. The system 700 can include the vehicle 105. The vehicle 105 can include the apparatus 205. The vehicle 105 can include at least one data processing system 705. The data processing system 705 can include at least one monitor component 710, at least one interface 715 and at least one control 720. The monitor component 710 can include at least one sensor. The sensors can collect data. The sensors can include at least one of a light sensor, a battery cell sensor, an interface sensor or a component sensor. The data processing system 705 or at least one component of the data processing system 705 can be external to the vehicle 105. For example, the data processing system 705 can be a remote server system (e.g., a cloud based data processing system) or a data processing system that is included in or stored on a user device (e.g., a mobile phone or tablet).

The monitor component 710 can include, communicate with or otherwise interface with a light sensor. The light sensor can collect data that can be used to detect light or determine a path of light. For example, the light sensor can detect light that is produced by the light source 215. The light sensor can also detect the path of the light produced by the light source 215. For example, the light sensor can detect that that light is traveling on the first path (e.g., the path of the light exiting the light source 215). The light sensor can be at least one of a photodetector, a photosensor, a phototransistor, a photoresistor or a photodiode.

The monitor component 710 can include, communicate with or otherwise interface with a battery cell sensor. The battery cell sensor can collect data that can be used to determine the state of charge (SoC) of the battery, the state of health (SoH) of the battery or energy consumption. For example, the battery cell sensor can collect data that pertains to the battery cell 120 of the vehicle 105. The battery cell sensor can include a voltage sensor or current sensor. The battery cell sensor can be used to determine a voltage. The monitor component 710 can determine the SoC of a battery based on monitoring voltage, amperage, or ampere hours remaining of the battery. For example, the monitor component 710 can determine the voltage or current output of the battery and compare the measurements with a predetermined graph for the battery to determine a SoC of the battery. In some cases, the monitor component 710 can determine the SoC of the battery as a percentage that is a function of the terminal voltage of the battery.

The monitor component 710 can include, communicate with or otherwise interface with an interface sensor. The interface sensor can collect data that can be used to determine a selection on an interface. For example, the interface sensor can be a tactile sensor. The interface sensor can detect an operator of the vehicle 105 selecting at least one option presented on a user interface (e.g., interface 715). For example, an operator can select on option to turn on the light source 215 (e.g., produce light).

The monitor component 710 can include, communicate with or otherwise interface with a component sensor. The component sensor can collect data that can be used to determine that an operator of the vehicle 105 has used or interacted with a component of the vehicle 105. For example, the component sensor can collect data that can be used to determine that the operator of the vehicle 105 has applied pressure to the brake pedal.

An operator of the vehicle 105, using the interface 715, can perform one or more operations of the apparatus 205. For example, an operator can select an icon displayed by the interface 715 to have the light source 215 produce light (e.g., the light source 215 turns on). Similarly, the operator can select an icon displayed by the interface 715 to have the light source 215 stop producing light (e.g., the light source 215 210 turns off). Similarly, the operator can select an icon displayed by the interface 715 to have the light source 215 switch between a producing light stage and a stop producing light stage (e.g., the light source 215 will switch between on and off repetitively).

The interface 715, responsive to the operator selecting the icon to have the light source 215 produce light, can communicate with the controller 720. The controller 720 can be mounted, attached, placed, secured or coupled with the light source 215. The controller 720, responsive to communicating with the interface 715, can provide, to the light source 215, a signal to produce light (e.g., the controller 720 provides a first signal that turns on the light source 215).

The interface 715, responsive to the operator selecting the icon to have the light source 215 stop producing light, can communicate with the controller 720. The controller 720, responsive to communicating with the interface 715, can provide, to the light source 215, a signal to stop producing light (e.g., the controller 720 provides a second signal that turns off the light source 215).

The data processing system 705 and a user device 745 can interact by using a network 740. The user device 745 can include at least one of a mobile phone, a smart watch, a tablet, a smart phone, an infotainment system of a vehicle (e.g., the infotainment system of the vehicle 105). An operator of the user device 745 can perform similar operations to that performed by selecting icons on the interface 715. For example, the user device 745 can include an application that has been stored on the user device 745 and is associated with the vehicle 105. For example, when an operator purchased the apparatus 205 or the vehicle 105 they received instructions of how to download the application and link the application with the vehicle 105. An operator of the user device 745 can select an icon on an interface of the user device 745 to have the light source 215 produce light.

The data processing system 705 can include at least one data repository 725. The data repository 725 can include, store, maintain or otherwise provide data. The data can be data that is collected and provided by the monitor component 710, data that is collected and provided by the interface 715 or data that is provided by the user device 745. The data this is provided by the monitor component 710 can be provided as monitor data 730. The data that is provided by the interface 715 can be provided as interface data 735. The data that is provided by the user device 745 can be provided as the interface data 735.

Figure 8:
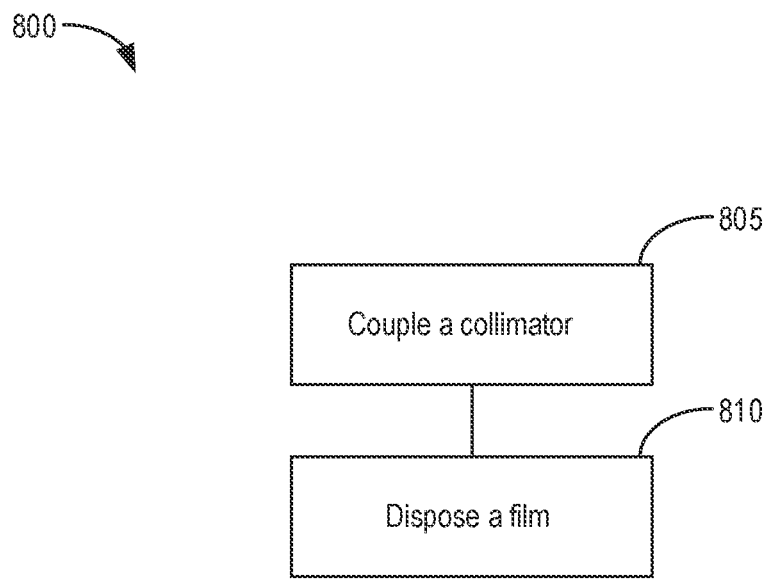
FIG. 8 depicts an example flow diagram of a process to manufacture an apparatus, in accordance with an implementation.

FIG. 8 is a flow diagram of a process 800 to manufacture an apparatus. The apparatus can be the apparatus 205. In ACT 805, a collimator can be coupled with a light fixture. The collimator can be the collimator 225. The light fixture can be the light fixture 210. The collimator 225 can be coupled with the light fixture 210 by attaching, securing, mounting or otherwise connecting the collimator 225 with the light fixture 210. The collimator 225 can adjust the light produced by a light source. For example, the collimator 225 can adjust the light produced by the light source 215. The collimator 225 can adjust the light produced by the light source 215 by receiving the light produced by light source 215 as the light exits, on a first path, the light source 215 and then the collimator 225 can adjust the light from the first path to a second path. The collimator 225 can adjust the light produced by the light source 215 from the first path to the second path by using at least one of a tube, a lens, a telescope or any other possible component that can receive the light produced by the light source 215 and then adjust the light from the first path to the second path.

In ACT 810, a film can be disposed on the collimator. The film can be the film 245. For example, the film 245 can be disposed on the collimator 225. The film 245 can be disposed on the collimator 225 by placing, locating, situating or otherwise positioning the film 245 on the collimator 225. The film 245 can conceal at least a portion of a light source. For example, the film 245 can conceal the light source 215. The film 245 can conceal the light source 215 by blocking, preventing, obstructing or otherwise covering the light source 215 in a way that the light source 215 is indiscernible, indistinguishable or otherwise unnoticeable by the naked eye.

Figure 9:
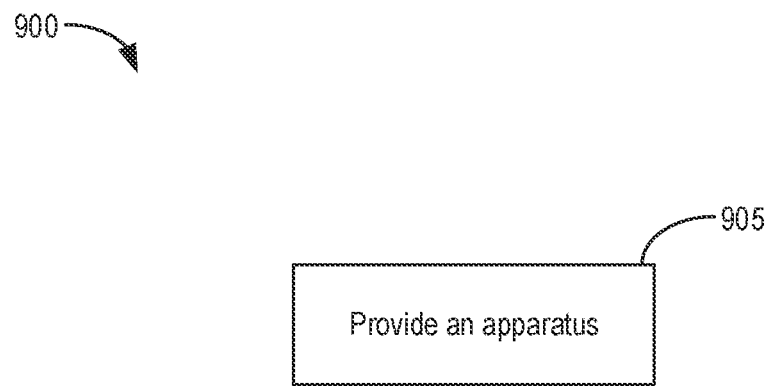
FIG. 9 depicts an example flow diagram of a process to provide an apparatus, in accordance with an implementation.

FIG. 9 is a flow diagram of a process 900 where an apparatus can be provided. One or more acts of the process 900 can be performed by one or more component depicted in FIG. 7, including, for example, the data processing system 705. In ACT 905, an apparatus can be provided. For example, the apparatus can be the apparatus 205. The apparatus 205 can be provided to a vehicle (e.g., the vehicle 105). The apparatus 205 can be provided during the manufacturing process of the vehicle 105. The apparatus 205 can be provided after the vehicle 105 has been purchased. For example, the apparatus 205 can be provided after the owner of the vehicle 105 purchases the apparatus 205 and the owner then takes the vehicle 105 to a shop that can then provide the apparatus 205. The owner of the vehicle 105 can provide the apparatus 205 on their own. For example, the owner of the vehicle 105 can provide the apparatus 205 upon purchasing the apparatus 205. The apparatus 205 can include a light fixture (e.g., the light fixture 210) and a collimator (e.g., the collimator 225). The light fixture 210 can include the light source 215 and the cover 220.

Figure 10:
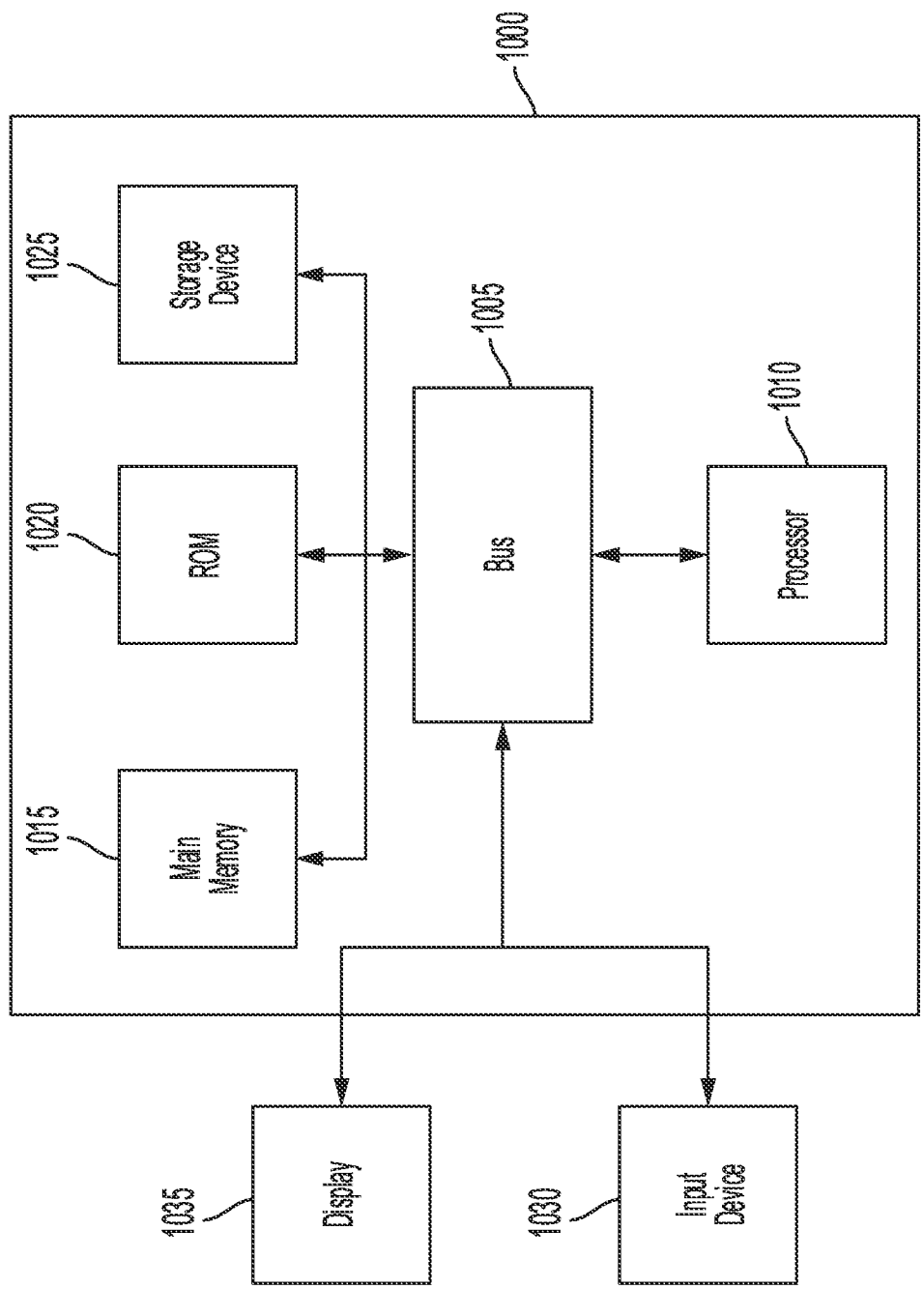
FIG. 10 is a block diagram illustrating an architecture for a computer system that can be employed to implement elements of the systems and methods described and illustrated herein.

FIG. 10 depicts an example block diagram of an example computer system 1000. The computer system or computing device 1000 can include or be used to implement a data processing system or its components. The computing system 1000 includes at least one bus 1005 or other communication component for communicating information and at least one processor 1010 or processing circuit coupled to the bus 1005 for processing information. The computing system 1000 can also include one or more processors 1010 or processing circuits coupled to the bus 1005 for processing information. The computing system 1000 also includes at least one main memory 1015, such as a random access memory (RAM) or other dynamic storage device, coupled to the bus 1005 for storing information, and instructions to be executed by the processor 1010. The main memory 1015 can be used for storing information during execution of instructions by the processor 1010. The computing system 1000 may further include at least one read only memory (ROM) 1020 or other static storage device coupled to the bus 1005 for storing static information and instructions for the processor 1010. A storage device 1025, such as a solid state device, magnetic disk or optical disk, can be coupled to the bus 1005 to persistently store information and instructions.

The computing system 1000 may be coupled via the bus 1005 to a display 1035, such as a liquid crystal display, or active matrix display, for displaying information to a user such as a driver of the electric vehicle 105 or other end user. An input device 1030, such as a keyboard or voice interface may be coupled to the bus 1005 for communicating information and commands to the processor 1010. The input device 1030 can include a touch screen display 1035. The input device 1030 can also include a cursor control, such as a mouse, a trackball, or cursor direction keys, for communicating direction information and command selections to the processor 1010 and for controlling cursor movement on the display 1035.

The processes, systems and methods described herein can be implemented by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes described herein. One or more processors in a multi-processing arrangement may also be employed to execute the instructions contained in main memory 1015. Hard-wired circuitry can be used in place of or in combination with software instructions together with the systems and methods described herein. Systems and methods described herein are not limited to any specific combination of hardware circuitry and software.

Although an example computing system has been described in FIG. 10, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:
   a light fixture disposed at least partially within a vehicle;
   a collimator, coupled with the light fixture, to adjust light produced by a light source from a first path to a second path;
   a film having a honeycomb pattern, and the film configured to;
      conceal at least a portion of the light source from view external to the vehicle; and
      prevent at least a portion of the light produced by the light source from exiting the apparatus; and
   a cover disposed superior to the film, the cover configured to:
      match a contour of a segment of the vehicle that includes the apparatus such that the apparatus is blended with the segment of the vehicle.

2. The apparatus of claim 1, comprising:
   a second collimator, coupled with the collimator, to adjust the light produced by the light source from the second path to a third path;
   a partition, coupled with the second collimator, to direct the light produced by the light source from the third path to a plate; and
   the plate to redirect the light produced by the light source.

3. The apparatus of claim 1, comprising:
   at least one first opening to transfer the light produced by the light source, wherein the at least one first opening has a first size; and
   at least one second opening to transfer the light produced by the light source, wherein the at least one second opening has a second size;
   wherein the first size and the second size are different.

4. The apparatus of claim 1, wherein the light fixture is at least one of a head light, a tail light, a crossbar light, a light bar, a charge indicator light, a turn signal light, a directional light, a reverse light, a flood light, a stop light, a fog light, an interior light, a display light, or a dome light.

5. The apparatus of claim 1, wherein the light source includes at least one of a light emitting diode, an incandescent bulb, a fluorescent lamp, or a halogen lamp.

6. The apparatus of claim 1, wherein the light fixture is electrically coupled with a power source.

7. The apparatus of claim 1, comprising:
   a data processing system, the data processing system comprising at least one processor, coupled with memory, to:
      provide, to the light source, a first signal to produce light; and
      provide, to the light source, a second signal to stop producing light.

8. A method for manufacturing an apparatus, comprising:
coupling a collimator with a light fixture, the collimator configured to adjust light produced by a light source from a first path to a second path, and the light fixture to dispose at least partially within a vehicle;
disposing a film on the collimator, the film having a honeycomb pattern, and the film configured to:
conceal at least a portion of the light source from view external to the vehicle; and
prevent at least a portion of the light produced by the light source from exiting the apparatus; and
disposing a cover superior to the film, the cover configured to:
match a contour of a segment of the vehicle that includes that apparatus such that the apparatus is blended with the segment of the vehicle.

9. The method of claim 8, comprising:
coupling a second collimator with the collimator, the second collimator configured to adjust the light produced by the light source from the second path to a third path;
disposing a partition on the second collimator, the partition configured to direct the light produced by the light source from the third path to a plate; and
coupling the plate with the partition, the plate configured to redirect the light produced by the light source.

10. The method of claim 8, comprising:
defining, by a placement of the film on a plate, a first opening of the plate, the first opening configured to transfer the light produced by the light source, wherein the first opening has a first size; and
defining, by the placement of the film on the plate, a second opening of the plate, the second opening configured to transfer the light produced by the light source, wherein the second opening has a second size; wherein the first size and the second size are different.

11. The method of claim 8, wherein the light fixture is at least one of a head light, a tail light, a crossbar light, a light bar, a charge indicator light, a turn signal light, a directional light, a reverse light, a flood light, a stop light, a fog light, an interior light, a display light, or a dome light.

12. The method of claim 8, wherein the light source includes at least one of a light emitting diode, an incandescent bulb, a fluorescent lamp, or a halogen lamp.

13. The method of claim 8, comprising:
electrically coupling the light fixture with a power source.

14. The method of claim 8, comprising:
electrically coupling a processing circuit with the light source, the processing circuit configured to provide a first signal, to the light source, to produce light and the processing circuit configured to provide, a second signal, to the light source, to stop producing light.

15. An electric vehicle, comprising:
an apparatus comprising:
a light fixture disposed at least partially within the electric vehicle;
a collimator, coupled with the light fixture, to adjust light produced by a light source from a first path to a second path;
a film having a honeycomb pattern, and the film configured to:
conceal at least a portion of the light source from view external to the electric vehicle; and
prevent at least a portion of the light produced by the light source from exiting the apparatus; and
a cover disposed superior to the film, the cover configured to:
match a contour of a segment of the electric vehicle that includes the apparatus such that the apparatus is blended with the segment of the electric vehicle.

16. The electric vehicle of claim 15, comprising:
the apparatus including:
a second collimator, coupled with the collimator, to adjust the light produced by the light source from the second path to a third path;
a partition, coupled with the second collimator, to direct the light produced by the light source from the third path to a plate; and
the plate to redirect the light produced by the light source.

17. The electric vehicle of claim 15, wherein the light fixture is at least one of a head light, a tail light, a crossbar light, a light bar, a charge indicator light, a turn signal light, a directional light, a reverse light, a flood light, a stop light, a fog light, an interior light, a display light, or a dome light.

* * * * *